United States Patent
Saito

(10) Patent No.: US 9,466,993 B2
(45) Date of Patent: Oct. 11, 2016

(54) CHARGE AND DISCHARGE CONTROL CIRCUIT HAVING AN INTERMEDIATE TERMINAL DISCONNECTION DETECTING CIRCUIT FOR DETECTING DISCONNECTION WITH SECONDARY BATTERIES

(71) Applicant: Seiko Instruments Inc., Chiba-shi, Chiba (JP)

(72) Inventor: Hiroshi Saito, Chiba (JP)

(73) Assignee: SII Semiconductor Corporation (JP)

( * ) Notice: Subject to any disclaimer, the term of this patent is extended or adjusted under 35 U.S.C. 154(b) by 239 days.

(21) Appl. No.: 14/288,952

(22) Filed: May 28, 2014

(65) Prior Publication Data

US 2014/0361746 A1     Dec. 11, 2014

(30) Foreign Application Priority Data

Jun. 7, 2013   (JP) ................................ 2013-121036

(51) Int. Cl.
  *H02J 7/00*        (2006.01)
(52) U.S. Cl.
  CPC .................................. *H02J 7/0031* (2013.01)

(58) Field of Classification Search
  USPC ........................................................ 320/118
  See application file for complete search history.

(56) References Cited

U.S. PATENT DOCUMENTS

2010/0245141 A1*   9/2010   Ushie .................. H03M 1/1076
                                                       341/122
2011/0050172 A1*   3/2011   Sano et al. ..................... 320/118

FOREIGN PATENT DOCUMENTS

JP         08-308115 A      11/1996

* cited by examiner

*Primary Examiner* — Suchin Parihar
(74) *Attorney, Agent, or Firm* — Brinks Gilson & Lione

(57)   ABSTRACT

The present invention provides a charge and discharge control circuit and a battery device capable of detecting an intermediate terminal disconnection without causing the balance between battery voltages to collapse and shortening the service life of the battery device. A charge and discharge control circuit which controls charging/discharging of a plurality of secondary batteries connected in series is equipped with intermediate terminal disconnection detecting circuits each of which is provided between a positive electrode terminal and a negative electrode terminal of each secondary battery and detects an intermediate terminal disconnection of each intermediate terminal by intermittently equal detection currents.

4 Claims, 3 Drawing Sheets

CHARGE AND DISCHARGE CONTROL CIRCUIT HAVING AN INTERMEDIATE TERMINAL DISCONNECTION DETECTING CIRCUIT FOR DETECTING DISCONNECTION WITH SECONDARY BATTERIES

RELATED APPLICATIONS

This application claims priority under 35 U.S.C. §119 to Japanese Patent Application No. 2013-121036 filed on Jun. 7, 2013, the entire content of which is hereby incorporated by reference.

BACKGROUND OF THE INVENTION

1. Field of the Invention

The present invention relates to a plurality of secondary batteries connected in series, a charge/discharge control circuit equipped with an intermediate terminal disconnection detecting circuit for detecting disconnection with the secondary batteries, and a battery device.

2. Background Art

In a battery device equipped with a plurality of secondary batteries connected in series, when disconnection (hereinafter called intermediate terminal disconnection) of a connecting portion of each secondary battery and a charge/discharge control circuit occurs, it is not possible to perform charge/discharge control of the secondary batteries. That is, there was a problem that though the secondary batteries were in overcharge or overdischarge, it could not be detected, thus giving large stress to the secondary batteries. Therefore, there has been proposed a battery device equipped with an intermediate terminal disconnection detecting circuit for the purpose of detecting the intermediate terminal disconnection to thereby enhance safety of the secondary batteries.

A circuit diagram of a battery device equipped with a related art intermediate terminal disconnection detecting circuit is shown in FIG. 3. The battery device includes secondary batteries 107a and 107b, a charge control FET 106, a discharge control FET 105, external terminals 112 and 113, and a charge/discharge control circuit 201.

The charge/discharge control circuit 201 is composed of a positive power supply connection terminal 108 to which a positive power supply of the secondary battery 107a is connected, an intermediate terminal 109 connected to a connecting point of a negative power supply of the secondary battery 107a and a positive power supply of the secondary battery 107b, a negative power supply connection terminal 110 to which a negative power supply of the secondary battery 107b is connected, a voltage detection circuit 102 for monitoring the voltage between the positive power supply connection terminal 108 and the intermediate terminal 109, a voltage detection circuit 103 for monitoring the voltage between the intermediate terminal 109 and the negative power supply connection terminal 110, a control circuit 204 for outputting signals for controlling the charge control FET 106 and the discharge control FET 105 in response to the outputs of the voltage detection circuits 102 and 103, and an intermediate terminal disconnection detecting circuit 211.

The operation of the related art battery device will next be described.

When a voltage generator such as a charger is connected between the external terminals 112 and 113 to charge the secondary batteries 107a and 107b, the voltage detection circuit 102 outputs a detection signal to the control circuit 204 when the voltage of the secondary battery 107a reaches a predetermined voltage or higher set by the voltage detection circuit 102. Then, the control circuit 204 having received the signal therein outputs a signal for turning off the charge control FET 106 to turn off the charge control FET 106 to thereby avoid a charging current from flowing and thereby controls the secondary battery 107a so as to prevent its overcharging.

When a load such as a resistor is connected between the external terminals 112 and 113 to discharge the secondary batteries 107a and 107b, the voltage detection circuit 102 outputs a detection signal to the control circuit 204 when the voltage of the secondary battery 107a becomes a different predetermined voltage or less set by the voltage detection circuit 102. Then, the control circuit 204 having received the signal therein outputs a signal for turning off the discharge control FET 105 to turn off the discharge control FET 105 to thereby avoid a discharging current from flowing and thereby controls the secondary battery 107a so as to prevent its overdischarging.

The intermediate terminal disconnection detecting circuit 211 is set to supply more current than the current flowing through the voltage detection circuit 102. When the connection between the intermediate terminal 109 and the secondary battery 107 is disconnected, the voltage of the intermediate terminal 109 is pulled up by the intermediate terminal disconnection detecting circuit 211. Accordingly, the difference in voltage between the intermediate terminal 109 and the negative power supply connection terminal 110 becomes large. When it becomes a predetermined voltage or higher set by the voltage detection circuit 103, the voltage detection circuit 103 detects an intermediate terminal disconnection and outputs its signal to the control circuit 204. Since the intermediate terminal disconnection can be detected by providing the intermediate terminal disconnection detecting circuit 211 in this manner, it is possible to provide a high safety battery device (refer to, for example, FIG. 1 in Japanese Unexamined Patent Application Publication No. Hei 8(1996)-308115).

In the conventional charge/discharge control circuit and battery device, however, a difference occurs between current consumed by the secondary battery 107a and current consumed by the secondary battery 107b due to the current flowing through the intermediate terminal disconnection detecting circuit 211. A problem arose in that since this current difference became an unbalance current for each secondary battery to be connected and caused the balance between battery voltages to collapse, the service life of the battery device would be shortened.

SUMMARY OF THE INVENTION

The present invention has been devised to solve the problems described above, and achieves a charge/discharge control circuit and a battery device capable of detecting an intermediate terminal disconnection without causing the balance between battery voltages to collapse and shortening the service life of the battery device.

In order to solve the related art problems, a charge/discharge control circuit and a battery device according to the present invention have the following configuration.

There are provided at least, a positive power supply connection terminal, an intermediate terminal and a negative power supply connection terminal respectively connected with a positive electrode terminal, an inter-battery connection terminal and a negative electrode terminal of each of a plurality of secondary batteries connected in series; intermediate terminal disconnection detecting circuits each allowing a detection current to flow by switching at every predetermined time between the positive power supply connection terminal and the intermediate terminal, between the intermediate terminals adjacent to each other and between the intermediate terminal and the negative power supply connection terminal; a plurality of voltage detection circuits respectively connected in parallel with the secondary batteries; a control circuit inputted with outputs of the voltage detection circuits; and an intermediate terminal disconnection control circuit that controls the intermediate terminal disconnection detecting circuits.

According to the present invention, the intermediate terminal disconnection detecting circuits are switched by the switches at intervals of constant time to make the same the times during which the intermediate terminal detecting circuits are being connected to the secondary batteries, whereby the time during which an unbalance current for each secondary battery flows becomes the same. As a result, the unbalance current for all the secondary batteries can be cancelled on the time average. Further, it is possible to prevent the balance between battery voltages from being lost and prevent the service life of the battery device from being shortened.

DETAILED DESCRIPTION OF THE PREFERRED EMBODIMENTS

Preferred embodiments of the present invention will hereinafter be described with reference to the accompanying drawings.

First Embodiment

Figure 1:
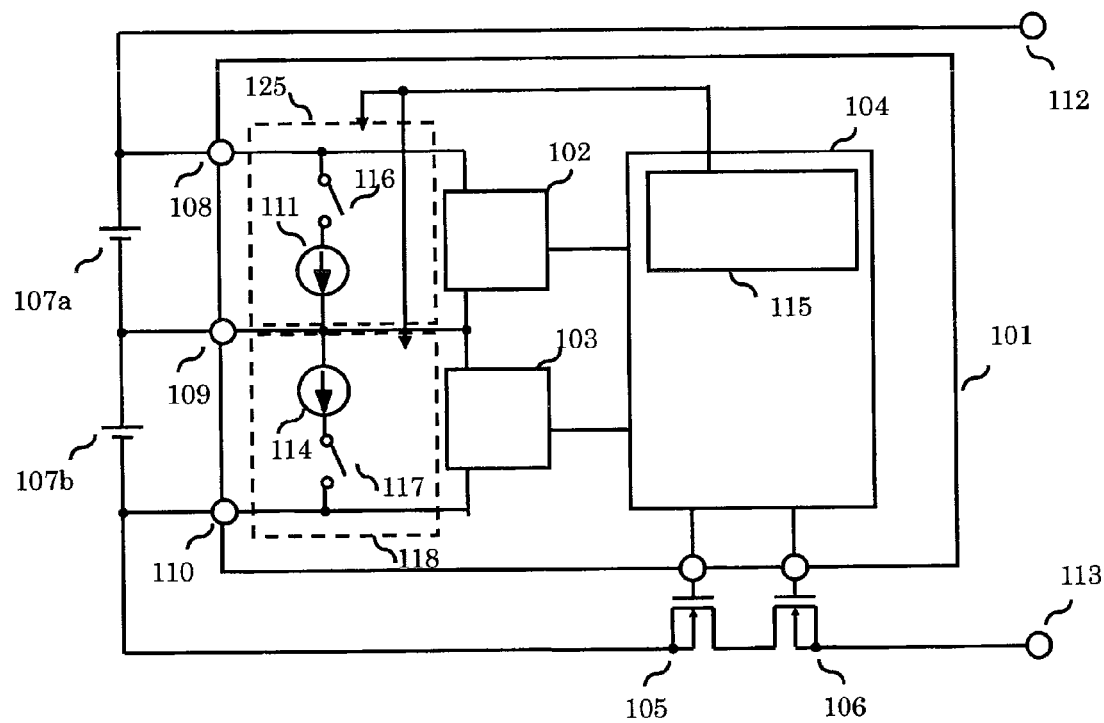
FIG. 1 is a circuit diagram of a battery device equipped with a charge/discharge control circuit according to a first embodiment.

FIG. 1 is a circuit diagram of a battery device equipped with a charge/discharge control circuit according to a first embodiment. The battery device includes secondary batteries 107a and 107b, a charge control FET 106, a discharge control FET 105, external terminals 112 and 113, and a charge/discharge control circuit 101. The charge/discharge control circuit 101 includes a positive power supply connection terminal 108, an intermediate terminal 109, a negative power supply connection terminal 110, an intermediate terminal disconnection detecting circuit 125, an intermediate terminal disconnection detecting circuit 118, a voltage detection circuit 102, a voltage detection circuit 103, and a control circuit 104 having an intermediate terminal disconnection control circuit 115. The intermediate terminal disconnection detecting circuit 125 is composed of a constant current source 111 and a switch 116. The intermediate terminal disconnection detecting circuit 118 is composed of a constant current source 114 and a switch 117.

The secondary battery 107a has a positive power supply connected to the external terminal 112 and the positive power supply connection terminal 108, and a negative power supply connected to the intermediate terminal 109. The secondary battery 107b has a positive power supply connected to the intermediate terminal 109, and a negative power supply connected to the negative power supply connection terminal 110 and the discharge control FET 105. The voltage detection circuit 102 is connected between the positive power supply connection terminal 108 and the intermediate terminal 109. The voltage detection circuit 103 is connected between the intermediate terminal 109 and the negative power supply connection terminal 110. The control circuit 104 is inputted with the outputs of the voltage detection circuits 102 and 103. The outputs of the control circuit 104 are connected to a gate of the charge control FET 106 and a gate of the discharge control FET 105 respectively. The charge control FET 106 and the discharge control FET 105 are connected between the negative power supply of the secondary battery 107b and the external terminal 113. The intermediate terminal disconnection detecting circuit 125 is connected between the positive power supply connection terminal 108 and the intermediate terminal 109. The intermediate terminal disconnection detecting circuit 118 is connected between the intermediate terminal 109 and the negative power supply connection terminal 110.

The voltage detection circuit 102 monitors the voltage between the positive power supply connection terminal 108 and the intermediate terminal 109. The voltage detection circuit 103 monitors the voltage between the intermediate terminal 109 and the negative power supply connection terminal 110. In response to the outputs of the voltage detection circuits 102 and 103, the control circuit 104 outputs signals for controlling the charge control FET 106 and the discharge control FET 105. The intermediate terminal disconnection control circuit 115 controls turning-on/off of the switches 116 and 117 by a control signal. The constant current source 111 pulls up the intermediate terminal 109 when the intermediate terminal 109 and each secondary battery are disconnected, i.e., an intermediate terminal disconnection occurs. The constant current source 114 pulls down the intermediate terminal 109 when the intermediate terminal 109 and each secondary battery are disconnected, i.e., an intermediate terminal disconnection occurs. The constant current sources 111 and 114 supply an equal current.

The operation of the battery device equipped with the charge/discharge control circuit according to the first embodiment will next be described.

When the charge/discharge control circuit 101 is monitoring the voltages of the secondary batteries 107a and 107b, the intermediate terminal disconnection control circuit 115 controls to turn on the switches 116 and 117 alternately for a predetermined time. When the switch 116 is turned on and the switch 117 is turned off, the constant current source 111 is connected between the positive power supply connection terminal 108 and the intermediate terminal 109. Also, when the switch 116 is turned off and the switch 117 is turned on, the constant current source 114 is connected between the intermediate terminal 109 and the negative power supply connection terminal 110.

When the switch 116 is turned on when the intermediate terminal 109 and each secondary battery are disconnected, i.e., the intermediate terminal disconnection occurs, the intermediate terminal 109 is pulled up by the constant current source 111 so that the difference in voltage between the intermediate terminal 109 and the negative power supply connection terminal 110 becomes large. Accordingly, the voltage detection circuit 103 detects the intermediate terminal disconnection when the inter-terminal voltage becomes a predetermined voltage or higher, and turns off the charge control FET 106. Further, when the switch 117 is tuned on when the intermediate terminal disconnection occurs, the intermediate terminal 109 is pulled down by the constant current source 114 so that the difference in voltage between the positive power supply connection terminal 108 and the intermediate terminal 109 becomes large. Accordingly, the voltage detection circuit 102 detects the intermediate terminal disconnection when the inter-terminal voltage becomes the predetermined voltage or higher, and turns off the charge control FET 106.

As described above, since the currents of the constant current source 111 and the constant current source 114 are equalized, and the times required to turn on the switches 116 and 117 are set equal, the currents flowing from the second battery 107a and the second battery 107b become equal to each other, thus making it possible to make equal influences on each secondary battery by the intermediate terminal disconnection detecting circuits.

Incidentally, the switches 116 and 117 may be controlled so as to be turned on by providing a period during which the switches 116 and 117 are both turned off, that is, leaving a predetermined interval in between. By controlling the switches in this way, it is possible to further reduce the time during which an unbalance current flows, and cancel the unbalance current on the time average by switching between the switches 116 and 117. At this time, the predetermined time or interval during which the switches 116 and 117 are turned on may be designed appropriately.

Although each intermediate terminal disconnection detecting circuit has been described as having the equal constant current sources and the equal on times, they may be set even in whatever form if the total amounts of detection currents flowing therethrough are equal.

The constant current sources are used with the intermediate terminals as pull-up and pull-down means, but are not limited thereto. Further, although a description has been made of the case where the two secondary batteries are connected, the number of secondary batteries is not limited thereto.

As described above, the battery device equipped with the charge/discharge control circuit according to the first embodiment is capable of canceling the unbalance current by the intermediate terminal disconnection detecting circuits on the time average and solving imbalance in battery voltage to lengthen the service life of the battery device.

Second Embodiment

Figure 2:
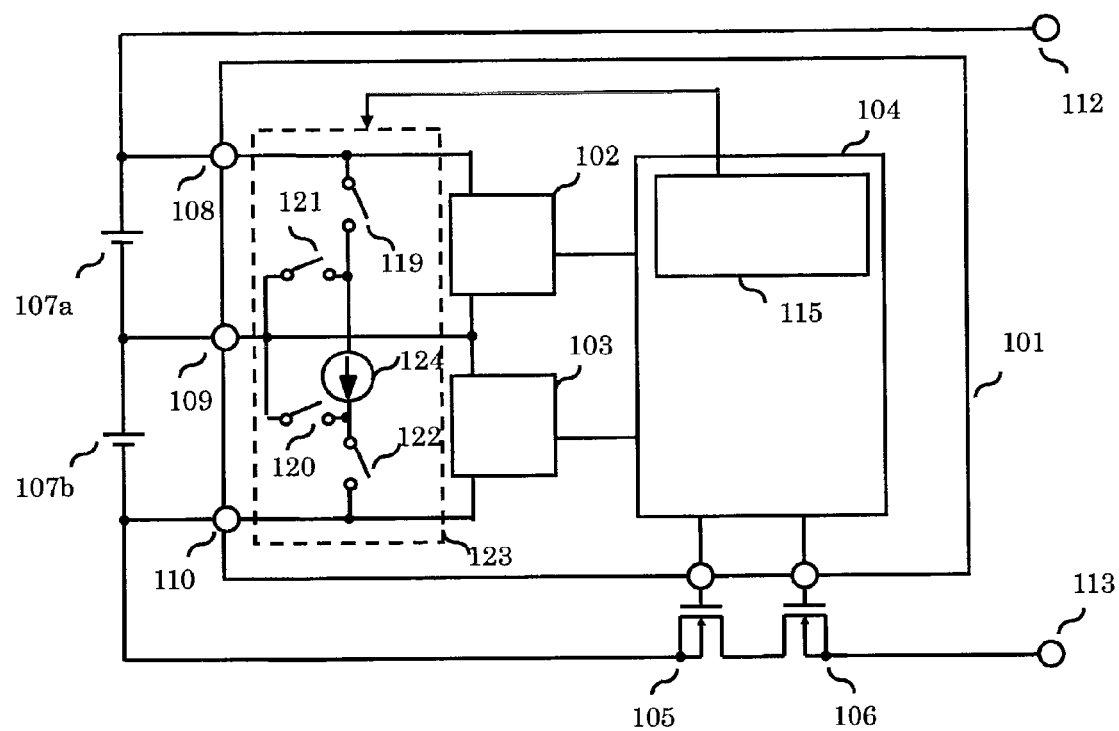
FIG. 2 is a circuit diagram of a battery device equipped with a charge/discharge control circuit according to a second embodiment.
Figure 3:
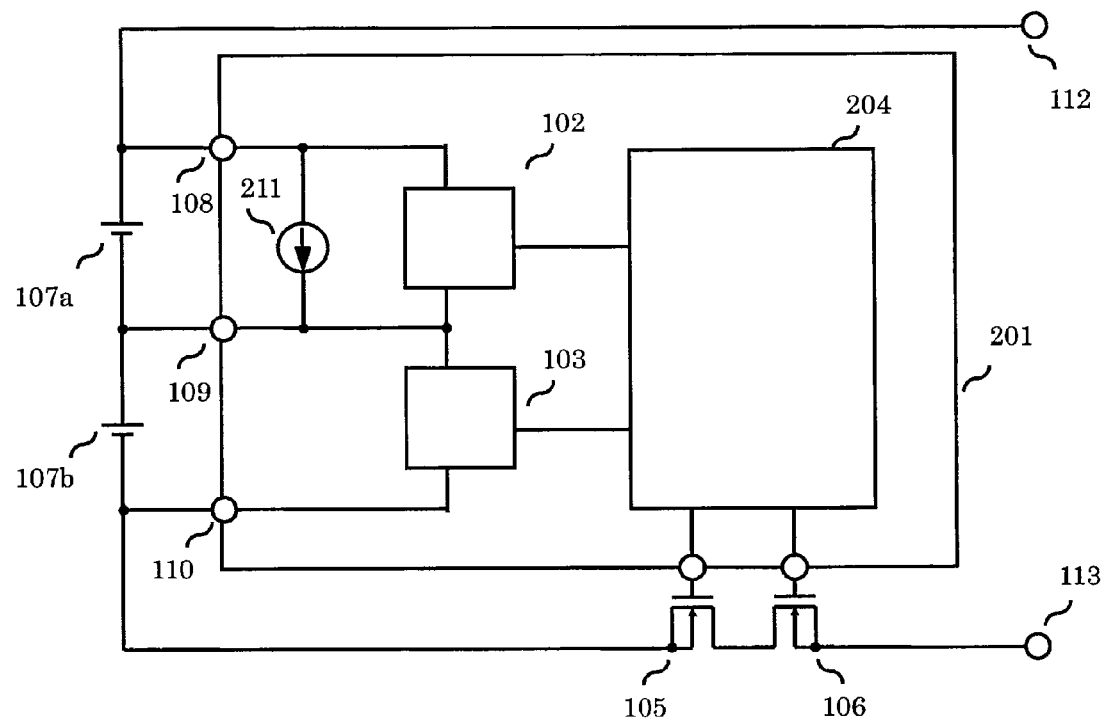
FIG. 3 is a circuit diagram of a charge/discharge control circuit and a battery device of related art.

FIG. 2 is a circuit diagram of a battery device equipped with a charge/discharge control circuit according to a second embodiment. An intermediate terminal disconnection detecting circuit 123 employed in the second embodiment includes a constant current source 124 and switches 119, 120, 121 and 122.

The switch 119 has one terminal connected to the positive power supply connection terminal 108 and the other terminal connected to one terminal of the constant current source 124. The other terminal of the constant current source 124 is connected to one terminal of the switch 122. The other terminal of the switch 122 is connected to the negative power supply connection terminal 110. The switch 121 has one connection terminal connected to a connecting point of the switch 119 and the constant current source 124, and the other terminal connected to the intermediate terminal 109. The switch 120 has one connection terminal connected to a connecting point of the switch 122 and the constant current source 124, and the other terminal connected to the intermediate terminal 109.

The operation of the battery device equipped with the charge/discharge control circuit according to the second embodiment will next be described.

When the charge/discharge control circuit 101 is monitoring the voltages of the secondary batteries 107a and 107b, the intermediate terminal disconnection control circuit 115 controls to turn on the switches 119 and 120 and the switches 121 and 122 alternately for a predetermined time. When the switches 119 and 120 are turned on and the switches 121 and 122 are turned off, the constant current source 124 is connected between the positive power supply connection terminal 108 and the intermediate terminal 109. Also, when the switches 119 and 120 are turned off and the switches 121 and 122 are turned on, the constant current source 124 is connected between the intermediate terminal 109 and the negative power supply connection terminal 110.

When the switches 119 and 120 are turned on when the intermediate terminal 109 and each secondary battery are disconnected, i.e., the intermediate terminal disconnection occurs, the intermediate terminal 109 is pulled up by the constant current source 124 so that the difference in voltage between the intermediate terminal 109 and the negative power supply connection terminal 110 becomes large. Accordingly, the voltage detection circuit 103 detects the intermediate terminal disconnection when the inter-terminal voltage becomes a predetermined voltage or higher, and turns off the charge control FET 106. Further, when the switches 121 and 122 are turned on when the intermediate terminal disconnection occurs, the intermediate terminal 109 is pulled down by the constant current source 124 so that the difference in voltage between the positive power supply connection terminal 108 and the intermediate terminal 109 becomes large. Accordingly, the voltage detection circuit 102 detects the intermediate terminal disconnection when the inter-terminal voltage becomes the predetermined voltage or higher, and turns off the charge control FET 106.

As described above, since the times during which the switches 119 and 120 and the switches 121 and 122 are turned on are set equal by the common constant current source 124, and the intermediate terminal disconnection is detected, the currents flowing from the second battery 107a and the second battery 107b become equal to each other, thus making it possible to make equal influences on each secondary battery by the intermediate terminal disconnection detecting circuit 123.

Incidentally, each switch may be controlled to be turned on with a predetermined interval left therebetween. By controlling the switches in this way, it is possible to further reduce the time during which an unbalance current flows, and cancel the unbalance current on the time average. At this time, the predetermined time or interval during which each switch is turned on may be designed appropriately.

Although each intermediate terminal disconnection detecting circuit has been described as having the equal constant current source and the equal on time, it may be set even in whatever form if the total amounts of detection currents flowing therethrough are equal.

The constant current source has been used with the intermediate terminal as pull-up and pull-down means, but is not limited thereto. Further, although a description has been made of the case where the two secondary batteries are connected, the number of secondary batteries is not limited thereto.

As described above, the battery device equipped with the charge/discharge control circuit according to the second embodiment is capable of canceling the unbalance current by the intermediate terminal disconnection detecting circuit on the time average and solving imbalance in battery voltage to lengthen the service life of the battery device.

What is claimed is:

1. A charge and discharge control circuit comprising at least:
   a positive power supply connection terminal;
   an intermediate terminal;
   a negative power supply connection terminal respectively connected with a positive electrode terminal;
   an inter-battery connection terminal and a negative electrode terminal of each of a plurality of secondary batteries connected in series;
   intermediate terminal disconnection detecting circuits each allowing a detection current to flow by switching at every predetermined time between the positive power supply connection terminal and the intermediate terminal, between the intermediate terminals adjacent to each other and between the intermediate terminal and the negative power supply connection terminal;
   a plurality of voltage detection circuits respectively connected in parallel with the secondary batteries;
   a control circuit inputted with outputs of the voltage detection circuits;
   wherein the control circuit comprises an intermediate terminal disconnection control circuit that controls the intermediate terminal disconnection detecting circuits.

2. The charge and discharge control circuit according to claim 1, wherein each of the intermediate terminal disconnection detecting circuits is controlled by a signal from the intermediate terminal disconnection control circuit and has a period during which the detection current is made not to flow.

3. The charge and discharge control circuit according to claim 1, wherein the intermediate terminal disconnection detecting circuits are provided in plural form in parallel with the voltage detection circuits respectively.

4. A battery device comprising:
   a plurality of secondary batteries connected in series;
   a charge and discharge control circuit, which controls charge and discharge of the secondary batteries; and
   charge and discharge control switches each controlled by the charge and discharge control circuit;
   wherein the charge and discharge control circuit comprises:
   a positive power supply connection terminal, an intermediate terminal and a negative power supply connection terminal respectively connected with a positive electrode terminal, an inter-battery connection terminal and a negative electrode terminal of each of a plurality of secondary batteries connected in series;
   intermediate terminal disconnection detecting circuits each allowing a detection current to flow by switching at every predetermined time between the positive power supply connection terminal and the intermediate terminal, between the intermediate terminals adjacent to each other and between the intermediate terminal and the negative power supply connection terminal;
   a plurality of voltage detection circuits respectively connected in parallel with the secondary batteries;
   a control circuit inputted with outputs of the voltage detection circuits;
   wherein the control circuit comprises an intermediate terminal disconnection control circuit that controls the intermediate terminal disconnection detecting circuits.

* * * * *